(12) United States Patent
Akiyama et al.

(10) Patent No.: US 7,002,737 B1
(45) Date of Patent: Feb. 21, 2006

(54) THREE-DIMENSIONAL CONFOCAL MICROSCOPE

(75) Inventors: Takashi Akiyama, Musashino (JP); Takayuki Kei, Musashino (JP); Kenta Mikuriya, Musashino (JP)

(73) Assignee: Yokogawa Electric Corp., Tokyo (JP)

( * ) Notice: Subject to any disclaimer, the term of this patent is extended or adjusted under 35 U.S.C. 154(b) by 0 days.

(21) Appl. No.: 10/929,554

(22) Filed: Aug. 31, 2004

(51) Int. Cl.
*G02B 21/00* (2006.01)
(52) U.S. Cl. .................................... 359/368; 359/666
(58) Field of Classification Search ................ 359/368, 359/666
See application file for complete search history.

(56) References Cited

U.S. PATENT DOCUMENTS 6,804,041 B1 * 10/2004 Giakos ........................ 359/296
6,898,021 B1 * 5/2005 Tang ........................... 359/666

FOREIGN PATENT DOCUMENTS

JP          2002-72102          3/2002

* cited by examiner

*Primary Examiner*—Mark A. Robinson
(74) *Attorney, Agent, or Firm*—Westerman, Hattori, Daniels & Adrian LLP.

(57) ABSTRACT

This invention realizes a three-dimensional confocal microscope in which mechanical vibrations do not occur in the scanning unit for scanning in the direction of optical axis, and in which scanning in the direction of optical axis can be carried out at a high speed. This invention has the following features. In the confocal microscope having a confocal scanner attached to an optical microscope and constructed to enable acquisition of an image of a sample as a confocal image by the confocal scanner, a variable-focus lens of surface tension control type having no moving part is uses as the field lens.

3 Claims, 4 Drawing Sheets

THREE-DIMENSIONAL CONFOCAL MICROSCOPE

BACKGROUND OF THE INVENTION

1. Field of the Invention

This invention relates to a three-dimensional confocal microscope and particularly to a three-dimensional confocal microscope for observing the three-dimensional shape of an observation target.

2. Description of the Related Art

By employing the Nipkow disk method that improves spatial resolution using a pinhole, a confocal microscope can condense light (laser beam) to a fine pinpoint illuminating the sample to be observed, and thus accurately measure one point in a three-dimensional space while eliminating redundant scattered light from the sample and poor focus. A confocal microscope of this type is described, for example, in JP-A-2002-72102.

With such a three-dimensional confocal microscope, it is possible to acquire slice images of individual layers of a sample without actually cutting the sample very thinly and to construct a precise three-dimensional image from the slice image data. Therefore, the confocal microscope is used for observation of physiological reactions and morphological observation of live cells in the fields of biology and biotechnology, or for surface observation of LSI devices in the semiconductor market.

FIG. 1 is a block diagram showing a conventional confocal microscope as described above. A confocal scanner 2 is attached to a camera port (not shown) of an optical microscope (hereinafter simply referred to as microscope) 3, and acquires a confocal image of a sample (not shown) after passing through the microscope 3, an actuator (for example, piezo-actuator) 4 and an objective lens 5. The image is picked up by a camera (for example, video rate camera) 1.

The video rate camera 1 outputs the picked-up image as a video signal 1a to the confocal scanner 2 and an image processing unit 6. The image processing unit 6 converts the video signal 1a to video data and stores the video data. On the other hand, the confocal scanner 2 performs rotational synchronization control of an internally installed Nipkow disk (not shown) in synchronization with the video signal 1a.

The actuator 4 is driven by a scanning control signal 7a outputted from a controller 7 and scans the objective lens 5 in the direction of the optical axis. As the focal plane of the objective lens 5 is scanned in the direction of optical axis, consecutive confocal slice images of cross sections of the sample are acquired.

For the scanning of the objective lens 5 in the direction of optical axis, a Z-axis motor may be used instead of the actuator.

FIGS. 2A and 2B are schematic views showing shift of the focal plane due to expansion and contraction of the actuator 4. FIG. 2A shows a case where the actuator is expanded. FIG. 2B shows a case where the actuator is contracted.

However, since the conventional confocal microscope as described above uses moving units having moving parts such as actuator and motor, mechanical vibrations necessarily occur and such vibrations adversely affect the observation.

For example, when the frequency component of the vibration coincides with the eigen frequency of the microscope body, resonance occurs. This would lead to a problem that the surface of the sample becomes unstable and cannot be correctly observed.

Moreover, in the conventional confocal microscope, since the moving speeds of the moving units are low and the scanning speed on the focal plane of the objective lens is as low as a few Hz, a three-dimensional confocal laser microscope for high-speed scanning cannot be realized.

SUMMARY OF THE INVENTION

It is an object of this invention to solve the foregoing problems and to realize a three-dimensional confocal microscope capable of high-speed scanning in the direction of the optical axis without generating mechanical vibrations in a scanning unit for scanning in the direction of optical axis.

DETAILED DESCRIPTION OF THE PREFERRED EMBODIMENTS

Figure 3A:
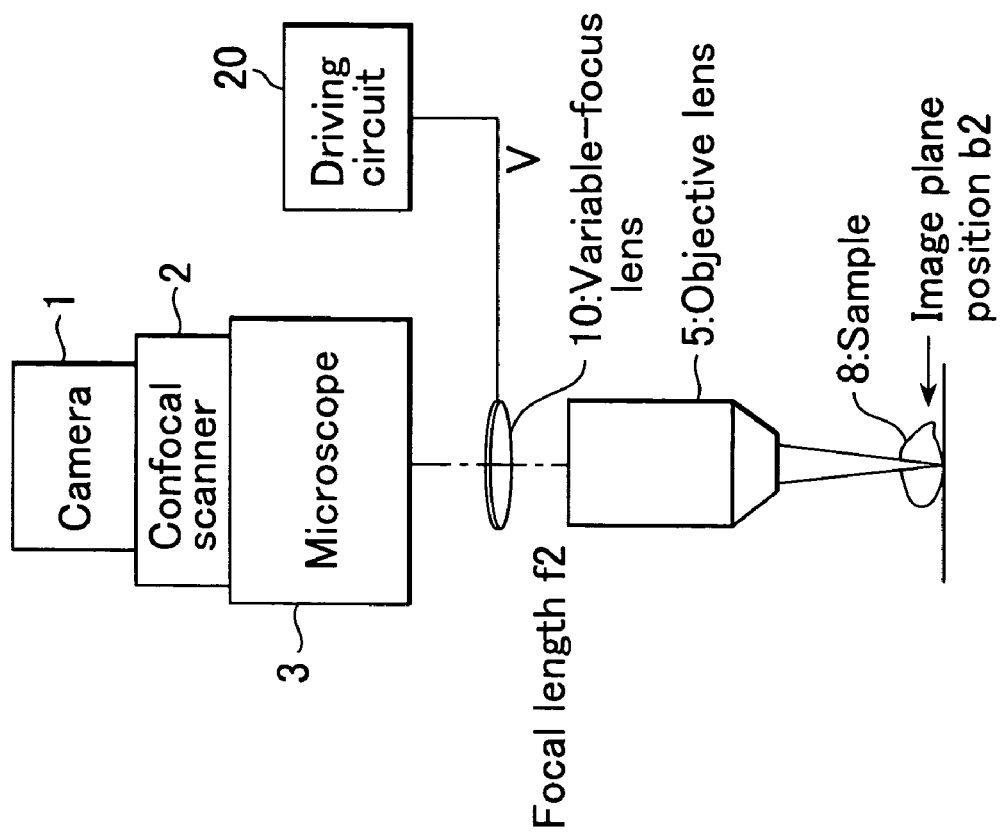
FIGS. 3A and 3B are block diagrams showing an embodiment of a three-dimensional confocal microscope according to this invention.
Figure 3B:
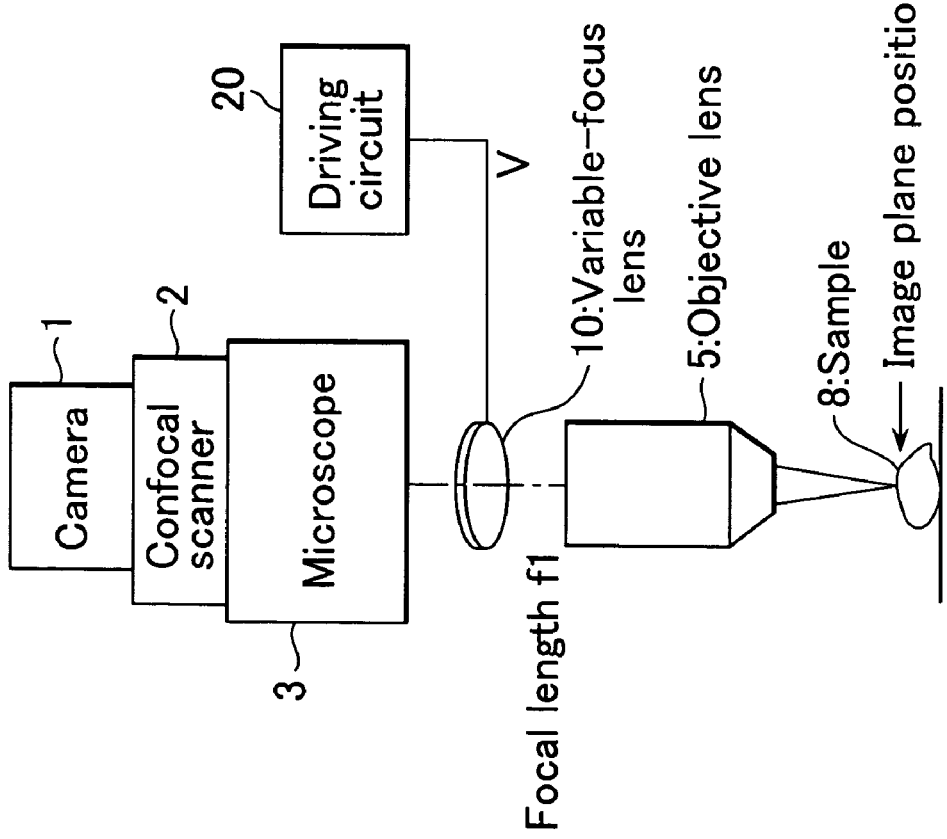

Hereinafter, this invention will be described in detail with reference to the drawings. FIGS. 3A and 3B are block diagrams showing an embodiment of a three-dimensional confocal microscope according to this invention. In this embodiment, since processing of an image picked up by a camera 1 is not directly related to this invention, the image processing unit of this invention, equivalent to the image processing unit 6 shown in FIG. 1, will not be shown in the drawings and will not be described in detail.

Figure 1:
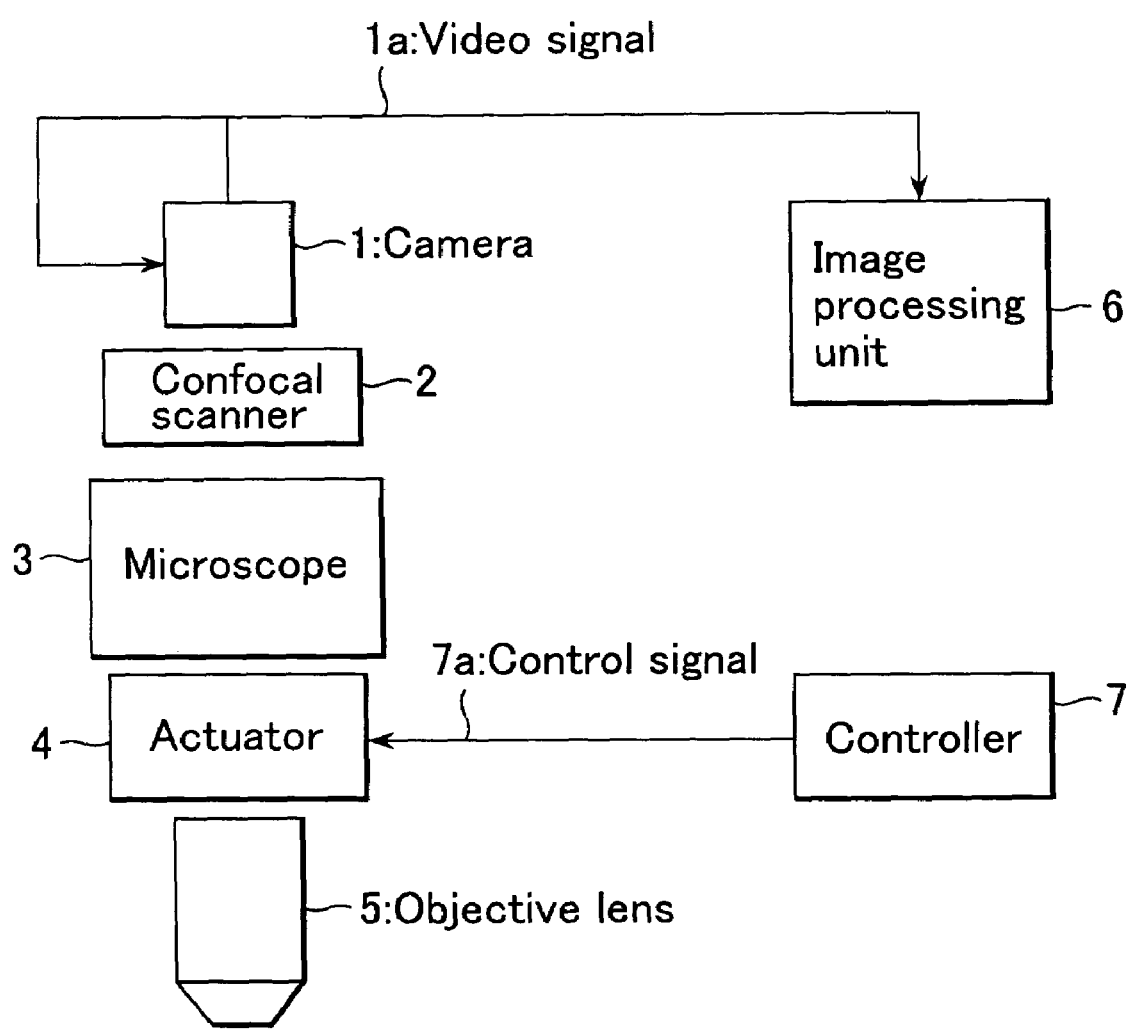
FIG. 1 is a block diagram showing a conventional confocal microscope.
Figure 2A:
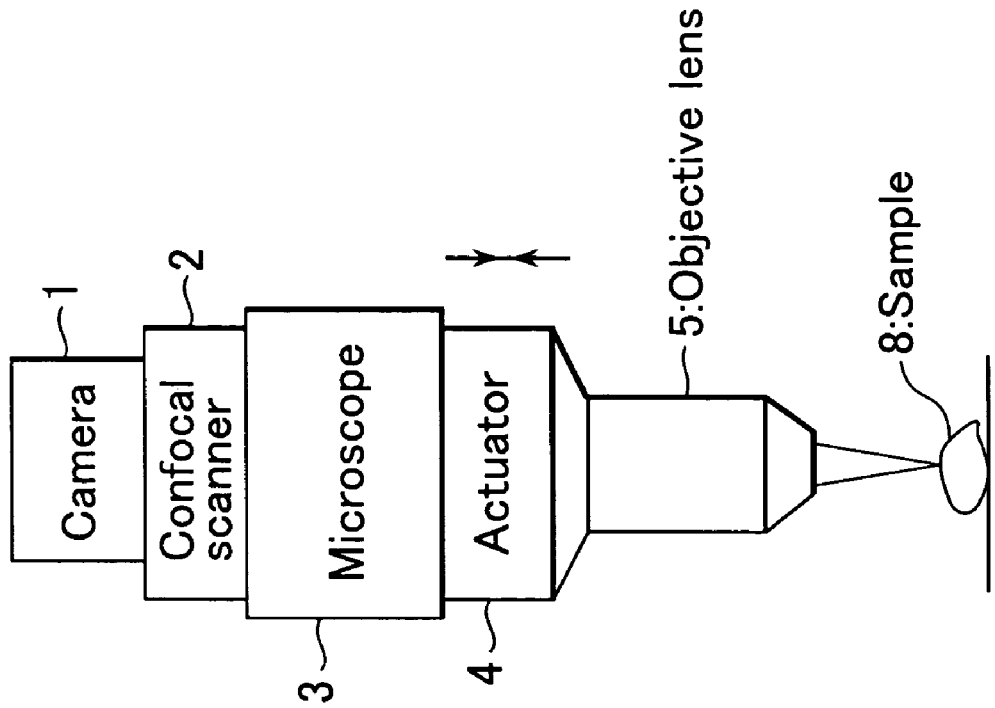
FIGS. 2A and 2B are schematic views showing shift of the focal plane due to expansion and contraction of an actuator in the confocal microscope shown in FIG. 1.
Figure 2B:
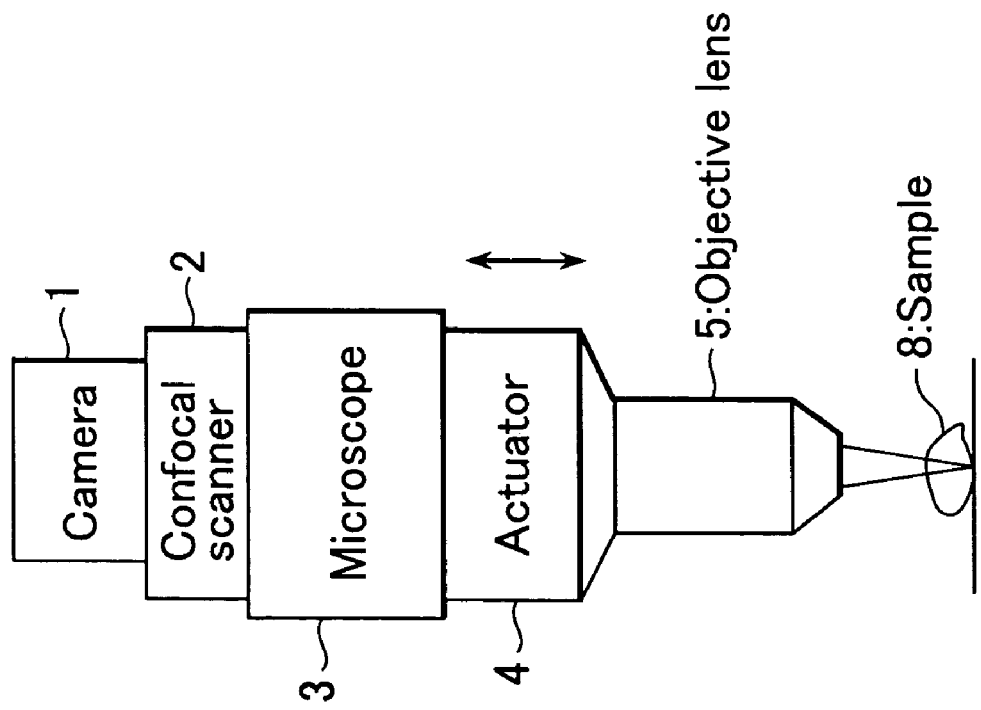

In FIGS. 3A and 3B, parts equivalent to those in FIG. 1 are denoted by the same numerals. FIGS. 3A and 3B differ from FIG. 1 in that a variable-focus lens of surface tension control type 10 and a driving circuit 20 are used instead of the actuator and the controller. The variable-focus lens of surface tension control type (hereinafter simply referred to as variable-focus lens) 10 is used as a field lens.

Figure 4:
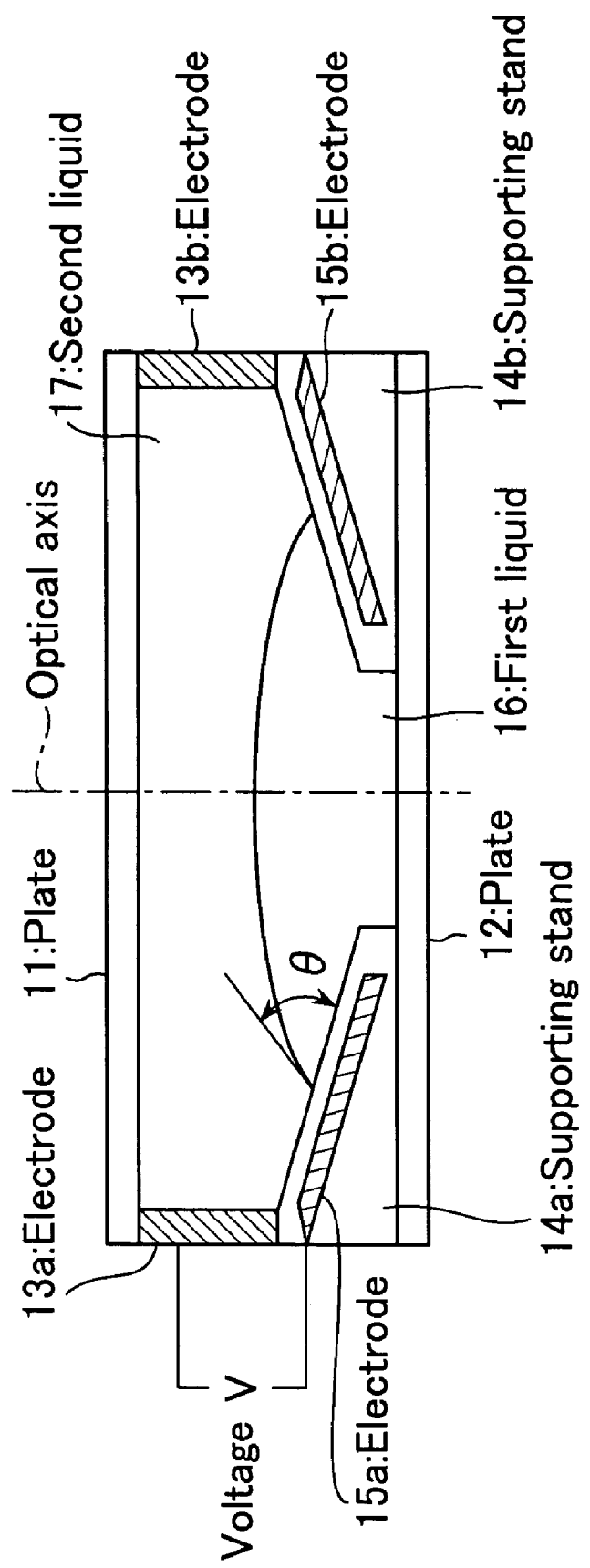
FIG. 4 is a theoretical structural view (cross-sectional view) showing an example of a variable-focus lens.

FIG. 4 shows a theoretical structural view (cross-sectional view) of a variable-focus lens manufactured by VARIOPTIC, which is an example of the variable-focus lens 10. This variable-focus lens is formed by constituent elements including transparent glass or plastic plates 11 and 12, electrically connected first electrodes 13a and 13b, supporting stands 14a and 14b, and second electrodes 15a and 15b buried in the supporting stands 14a and 14b, respectively, and electrically connected with each other.

A box comprising and also sealed by the plates 11, 12, the first electrodes 13a, 13b and the supporting stands 14a, 14b is filled with a first liquid (for example, oil) 16 and a second liquid (for example, water) 17 that do not mix with each other.

A voltage V (pulse width signal) outputted from the driving circuit 20 is applied between the first electrode 13a and the second electrode 15a.

A contact angle θ between the first liquid 16 and the supporting stand 14a (or 14b) varies according to the applied voltage V. Therefore, if the applied voltage V is changed, the contact angle θ, that is, the focal length f of this variable-focus lens can be changed.

Such a variable-focus lens is characterized in that when the focal length f is changed, no mechanical vibrations occur because of the absence of any moving part, and high-speed change of f (for example, at 50 Hz) can be realized without generating hysteresis.

The description now returns to FIG. 3. When the voltage is applied to the variable-focus lens 10 from the driving circuit 20 and the focal length of the variable-focus lens 10 is set to f1 as shown in FIG. 3A, the corresponding image plane position is b1. As the confocal scanner 2 scans in this state, one confocal slice image at the image plane position b1 can be acquired. The image can be picked up by the camera 1.

The confocal scanner 2 can usually acquire cross-sectional slice images at a rate of 100 images per second.

Next, when the applied voltage V is switched by the driving circuit 20 and the focal length of the variable-focus lens 10 is changed to f2 as shown in FIG. 3B, a confocal slice image at the image plane position b2 can be acquired accordingly.

Therefore, if the focal length of the variable-focus lens is continuously changed, cross-sectional confocal slice images at different image plane positions can be continuously acquired and three-dimensional information of the sample can be observed.

The timing of scanning by the confocal scanner 2 and the timing of switching the applied voltage by the driving circuit 20 are synchronous with each other and are controlled so that the focal length of the variable-focus lens 10 will not be switched during the scanning by the scanner.

This invention is not limited to the above-described embodiment and includes various changes and modifications without departing from the scope of the invention.

For example, while the variable-focus lens 10 in the above-described embodiment is arranged between the objective lens 5 and the microscope 3, its arrangement is not limited to this. The variable-focus lens 10 may be arranged within the confocal scanner 2 or between the confocal scanner 2 and the microscope 3. In short, the variable-focus lens 10 may be arranged at any position from within the confocal scanner 2 to the objective lens 5 as long as it functions as a field lens.

As described above, according to this invention, it is possible to easily realize a confocal microscope that uses a variable-focus lens of surface tension control type having no moving part as a field lens and thus can scan the focal plane of the microscope at a high speed (several tens of Hz) and can acquire a three-dimensional image at a high speed without being affected by mechanical vibrations.

What is claimed is:

1. A three-dimensional confocal microscope having a confocal scanner attached to an optical microscope, the three-dimensional confocal microscope being constructed to enable acquisition of an image of a sample as a confocal image by the confocal scanner, wherein a variable-focus lens of surface tension control type having no moving part is used as a field lens.

2. The three-dimensional confocal microscope as claimed in claim 1, wherein the variable-focus lens is arranged within the region from the confocal scanner to an objective lens of a microscope.

3. The three-dimensional confocal microscope as claimed in claim 1, wherein switching of focal length of the variable-focus lens of surface tension type and scanning by the confocal scanner are carried out synchronously.

* * * * *